United States Patent [19]

Batson

[11] 4,134,422
[45] Jan. 16, 1979

[54] IRRIGATION LINE MOVER

[75] Inventor: Paul E. Batson, Springfield, Oreg.

[73] Assignee: Crown American Irrigation, Inc., Eugene, Oreg.

[21] Appl. No.: 787,590

[22] Filed: Apr. 14, 1977

[51] Int. Cl.² .......................... A01M 7/00; B05B 3/12; G05G 3/00; B05B 3/00
[52] U.S. Cl. .................. 137/344; 74/577 S; 192/43.1; 239/178
[58] Field of Search .............. 137/344; 239/212, 177, 239/178; 74/577 S; 192/43.1

[56] References Cited

U.S. PATENT DOCUMENTS

| 169,804 | 11/1875 | Hamblin | 74/577 S |
|---|---|---|---|
| 852,921 | 5/1907 | Aspinwall | 74/577 S |
| 1,067,185 | 7/1913 | Maier | 74/577 S |
| 3,138,030 | 6/1964 | Godel | 74/577 |
| 3,202,172 | 8/1965 | Bergeron et al. | 137/344 |
| 3,318,531 | 5/1967 | Funk | 239/212 |
| 3,334,815 | 8/1967 | Hogg | 239/212 |
| 3,866,836 | 2/1975 | Dowd | 239/177 |
| 3,967,641 | 7/1976 | Bedard et al. | 137/344 |
| 4,034,779 | 7/1977 | Townsend | 239/177 |

Primary Examiner—Martin P. Schwadron
Assistant Examiner—A. Michael Chambers
Attorney, Agent, or Firm—Klarquist, Sparkman, Campbell, Leigh, Hall & Whinston

[57] ABSTRACT

The specification discloses an improved irrigation line move in which a line mover carries an engine rotating an irrigation pipe supported by wheels keyed to the pipe. The engine also drives wheels of a cart-like carriage of the line mover through reversible one-way clutches. Each clutch includes a sprocket keyed to an axle keyed to cart wheels and a lever-like pawl held by a spring extending around the axle in either an only forward driving position relative to the sprocket or an only reverse driving position relative to the sprocket.

8 Claims, 6 Drawing Figures

U.S. Patent  Jan. 16, 1979  Sheet 1 of 2  4,134,422
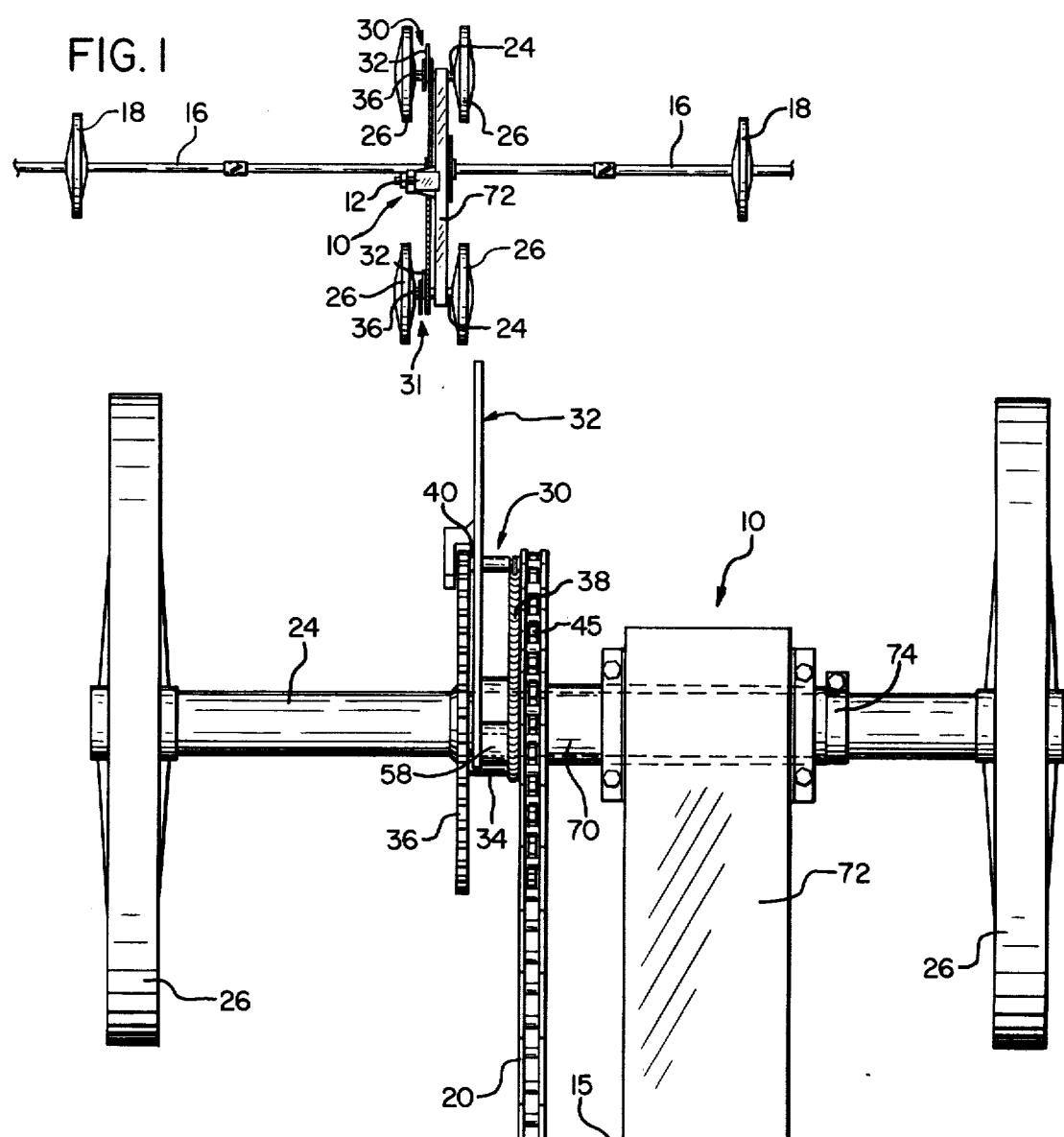
FIG. 1
FIG. 2
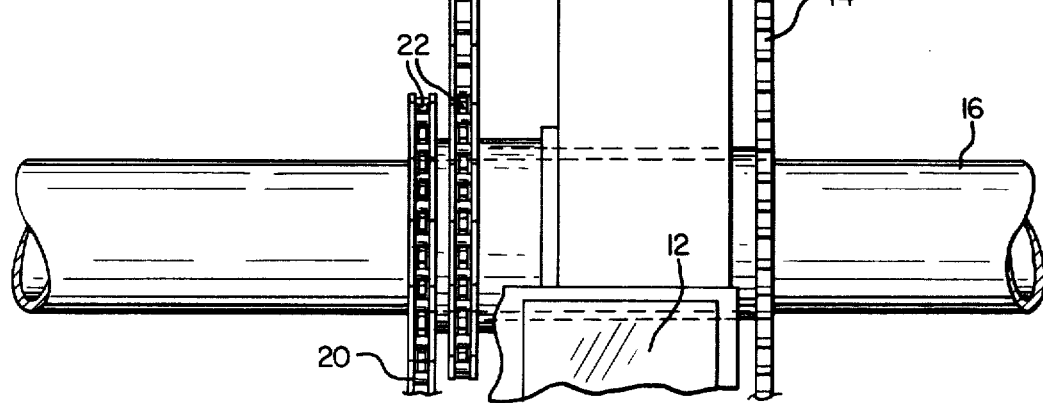

IRRIGATION LINE MOVER

DESCRIPTION

This invention relates to an improved irrigation line mover, and has for an object thereof the provision of a new and improved irrigation line mover.

Another object of the invention is to provide an irrigation line move having a reversible one-way clutch.

A further object of the invention is to provide an irrigation line mover having an easily reversed one-way clutch.

In the drawings:

FIG. 1 is a fragmentary, top plan view of an irrigation line move including an improved line mover forming one embodiment of the invention;

FIG. 2 is an enlarged, fragmentary top plan view of a line mover of the line of FIG. 1;

Figure 3:
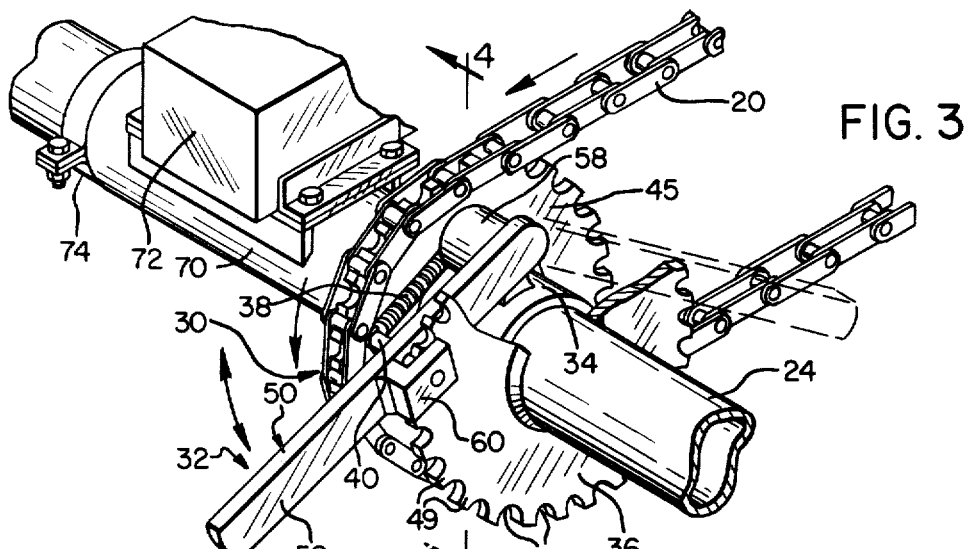
FIG. 3 is an enlarged, fragmentary, perspective view of the line mover of FIG. 2.

An irrigation line move, includes a line mover 10 forming one specific embodiment of the invention. The line mover 10 is cart-like and carries a prime mover in the form of an engine 12, which drives a bull gear 14 through a hydraulic drive including a motor 15, to turn an irrigation pipe 16 to turn wheels 18 keyed to and supporting the pipe 16. The prime mover also drives chains 20 through sprockets 22 keyed to the pipe 16 to drive axles 24 and wheels 26 of the line mover 10 through one-way clutches 30 and 31.

It is very important that the portions of the line extending beyond the line mover 10 do not get appreciably ahead of the line mover 10. If they do, the operator stops the drive of the line mover 10 and drives the pipe 16 and wheels 18 back while not moving the line mover 10. This is accomplished through the two-handed, but otherwise identical, one-way clutches 30 and 31 each of which includes a generally S-shaped pawl 32 pivotal on a sleeve 34 rotatable on axle 24 and a sprocket 36 keyed to the axle. A spring 38 connected at both of its ends to the pawl tends to keep a pin 40 of the pawl seated in the sprocket teeth. When the motor 15 is driven in reverse to correct alignment, the pipe 16 is rotated in reverse and the chains 20 drive sprockets 45 and the sleeves 34 clockwise, as viewed in FIGS. 3 and 4, and the pins merely ratchet over the sprockets 36 without turning them. However, when the sleeves 34 are driven forwardly (counter-clockwise as viewed in FIG. 4), the pins are pulled into the teeth and give positive, non-slip drives. This ratchet effect is made possible by the pivot point of the pawl 32 being well inside the pitchline of the sprocket 45.

Figure 4:
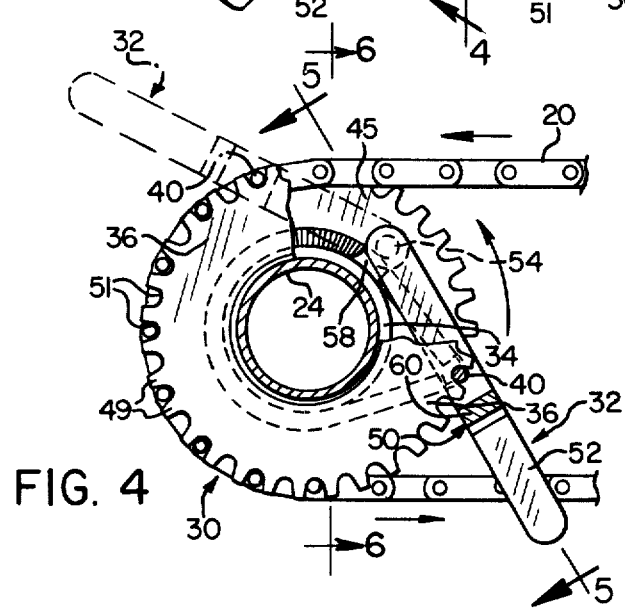
FIG. 4 is a vertical, sectional view taken along line 4—4 of FIG. 3.

To reverse the drive of the mover 10, each pawl 32 is merely swung to its broken line position of FIG. 4 which is the same as its full-line position of FIG. 3, the spring 38 sliding easily around the sleeve 34. Then, when the sleeve 34 is driven clockwise, as viewed in FIG. 4, the pawl 32 drives the sprocket 36, but when the sleeve 34 is driven counter-clockwise, the pin 40 is cammed out of engagement with teeth 49 of the sprocket 36. The sprocket 36 has U-shaped notches 51 forming the teeth 49.

The pawl 32 includes an arm 50 having a convenient handle portion 52, and, at its other end, a pin 54 is secured thereto and extends into a bore 56 (FIG. 6) in an ear 58 welded to the sleeve 34. The pin 54 is rotatable in the bore 56 to pivotally connect the arm 50 to the ear 58. The arm and an L-shaped member 60 welded thereto are adapted to bracket the sprocket 36, and the driving pin 40 is welded to the arm 50 and the member 60 and is adapted to move between or mesh with the teeth of the sprocket 36. The pin 40 extends outwardly from the arm 50 and has a grooved end portion 64 (FIG. 5) which receives and retains eyes 66 of the tension spring 38.

Figure 5:
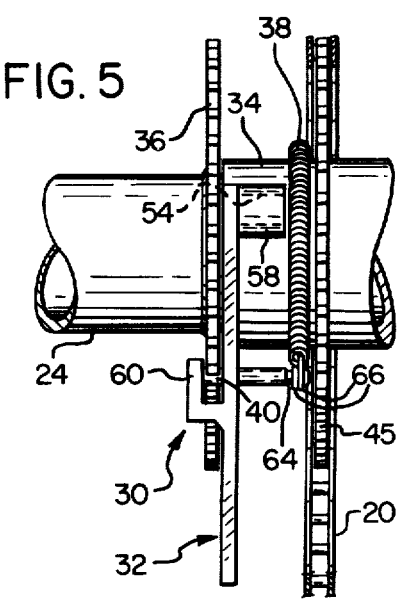
FIG. 5 is an enlarged, fragmentary, view taken along line 5—5 of FIG. 4.
Figure 6:
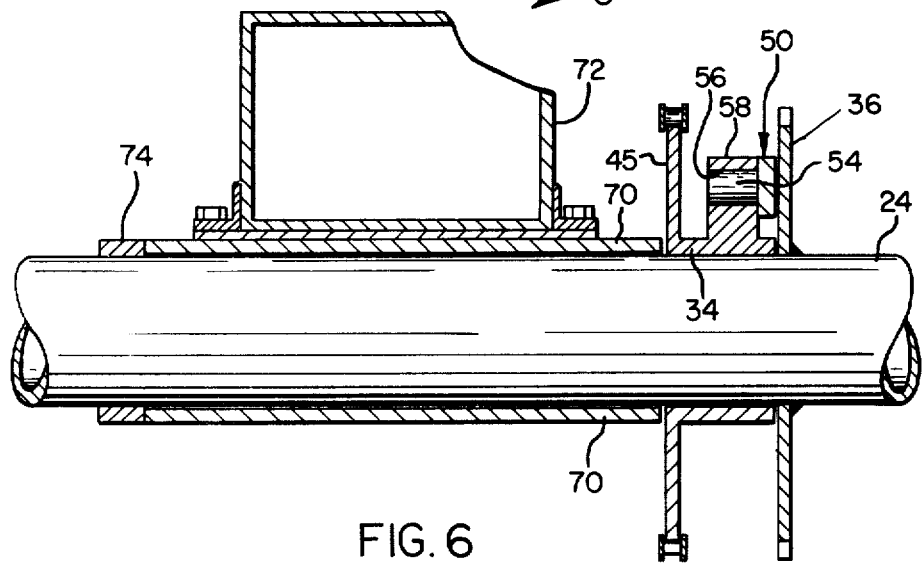
FIG. 6 is an enlarged fragmentary, vertical, sectional view taken along line 6—6 of FIG. 4.

As best shown in FIGS. 5 and 6, the sprocket 36 is welded to the axle 24, and the sleeve 34 is confined between the sprocket 36 and a journaling sleeve 70 carrying one end of a frame member 72 of the mover 10. The sleeve 70 is held against movement along the axle 24 by a split clamp 74. The ear 58 and the sprocket 36 confine the arm 50 to hold the pin 54 in the bore 56 in the ear and insure that the member 60 moves easily over the sprocket. It will be appreciated that the wheels 26 may be removed from the axles 24, the split clamps 74 loosened, and the axles slipped out from the sleeves 34 and 70 for repair or maintenance.

What is claimed is:

1. In an irrigation line move including a pipe,
 pipe supporting wheels keyed to the pipe,
 a cart-like carriage including a frame journaling the pipe and carriage wheel means supporting the frame,
 a reversible prime mover on the frame serving to rotate the pipe to roll the wheels,
 the improvement comprising:
 a driving member mounted on and freely rotatable on the carriage wheel means,
 drive train means connecting the driving member to the prime mover,
 a ratchet member comprising a sprocket keyed to the carriage wheel means,
 and reversible pawl means keyed to the driving member for driving the ratchet member,
 the wheel means including an axle and carriage wheels mounted on and keyed to the axle,
 the reversible pawl means including an arm pivotally mounted on the driving member at a point spaced radially from the pitchline of the sprocket, a pin on the arm and overcenter spring means urging the arm to urge the pin into engagement with the sprocket.

2. The irrigation line move of claim 1 wherein the spring means is a tension spring.

3. The irrigation line move of claim 1 wherein the arm includes a clevis-like portion holding the pin and adapted to bracket the sprocket.

4. The irrigation line move of claim 3 wherein the frame includes a bearing portion journaling the axle, and spaced from the sprocket, the driving member comprising a second sprocket rotatable on the axle and confined between one end of the bearing portion and the first-mentioned sprocket, and split clamp means on the axle and engaging the other end of the bearing portion.

5. In an irrigation line move including a pipe,
 pipe supporting wheels keyed to the pipe,
 a cart-like carriage including a frame journaling the pipe and carriage wheel means supporting the frame, a reversible prime mover on the frame serving to rotate the pipe to roll the wheels, the improvement comprising:

a driving member mounted on and freely rotatable on the carriage wheel means, drive train means connecting the driving member to the prime mover, a ratchet member comprising a sprocket keyed to the carriage wheel means, and reversible pawl means keyed to the driving member for driving the ratchet member, the wheel means including an axle and carriage wheels mounted on and keyed to the axle, the reversible pawl means including an arm pivotally mounted on the driving member at a point spaced radially from the pitchline of the sprocket, a pin on the arm and overcenter spring means urging the arm to urge the pin into engagement with the sprocket;

the spring means being a tension spring attached at both of its ends to the arm and extending around the axle, the arm including a clevis-like portion holding the pin and adapted to bracket the sprocket.

6. The irrigation line move of claim 5 wherein the frame includes a bearing portion journaling the axle, and spaced from the sprocket, the driving member comprising a second sprocket rotatable on the axle and confined between one end of the bearing portion and the first-mentioned sprocket, and split clamp means on the axle and engaging the other end of the bearing portion.

7. In an irrigation line move including a pipe:

pipe supporting wheels keyed to the pipe, a cart-like carriage including a frame journaling the pipe and carriage wheel means supporting the frame, a reversible prime mover on the frame serving to rotate the pipe to roll the wheels, the improvement comprising:

a driving member mounted on and freely rotatable on the carriage wheel means, drive train means connecting the driving member to the prime mover, a ratchet member comprising a sprocket keyed to the carriage wheel means, and reversible pawl means keyed to the driving member for driving the ratchet member, the wheel means including an axle and carriage wheels mounted on and keyed to the axle, the reversible pawl means including an arm pivotally mounted on the driving member at a point spaced radially from the pitchline of the sprocket, a pin on the arm and overcenter spring means urging the arm to urge the pin into engagement with the sprocket, the arm including a clevis-like portion holding the pin and adapted to bracket the sprocket.

8. In an irrigation line move includig a pipe:

pipe supporting wheels keyed to the pipe, a cart-like carriage including a frame journaling the pipe and carriage wheel means supporting the frame, a reversible prime mover on the frame serving to rotate the pipe to roll the wheels, the improvement comprising:

a driving member mounted on and freely rotatable on the carriage wheel means, drive train means connecting the driving member to the prime mover, a ratchet member comprising a sprocket keyed to the carriage wheel means, and reversible pawl means keyed to the driving member for driving the ratchet member, the wheel means including an axle and carriage wheels mounted on and keyed to the axle, the reversible pawl means including an arm pivotally mounted on the driving member at a point spaced radially inwardly from the pitchline of the sprocket, a pin on the arm and overcenter spring means urging the arm to urge the pin into engagement with the sprocket, the arm having a handle portion extending beyond the sprocket.

* * * * *